United States Patent
Dods et al.

(10) Patent No.: US 10,862,805 B1
(45) Date of Patent: Dec. 8, 2020

(54) INTELLIGENT OFFLOADING OF SERVICES FOR A NETWORK DEVICE

(71) Applicant: Juniper Networks, Inc., Sunnyvale, CA (US)

(72) Inventors: Craig Dods, Stittsville (CA); Guangsong Huang, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 70 days.

(21) Appl. No.: 16/051,119

(22) Filed: Jul. 31, 2018

(51) Int. Cl.
| | |
|---|---|
| *H04L 29/08* | (2006.01) |
| *H04L 12/803* | (2013.01) |
| *H04L 12/851* | (2013.01) |
| *H04L 12/721* | (2013.01) |
| *H04L 12/26* | (2006.01) |
| *H04L 12/725* | (2013.01) |

(Continued)

(52) U.S. Cl.
CPC .......... *H04L 47/125* (2013.01); *H04L 43/026* (2013.01); *H04L 43/0876* (2013.01); *H04L 45/306* (2013.01); *H04L 45/38* (2013.01); *H04L 45/745* (2013.01); *H04L 47/2441* (2013.01); *H04L 47/2483* (2013.01); *H04L 67/2861* (2013.01); *H04W 52/0258* (2013.01); *H04L 63/0245* (2013.01); *H04L 69/22* (2013.01)

(58) Field of Classification Search
CPC ......... H04L 29/08576; H04L 29/06326; H04L 29/06319; H04L 67/2861; H04L 47/125; H04W 36/0011; H04W 80/10; H04W 52/0258

See application file for complete search history.

(56) References Cited

U.S. PATENT DOCUMENTS

| | | |
|---|---|---|
| 6,633,565 B1 | 10/2003 | Bronstein et al. |
| 8,937,942 B1 * | 1/2015 | Li .............. H04L 67/1097 370/386 |

(Continued)

OTHER PUBLICATIONS

Tiago Fioreze et al., "A Statistical Analysis of Network Parameters for the Self-Management of Lambda-Connections", https://pdfs.semanticscholar.org/18cc/2258a67c06fe3c97affd4a9da3410a3e89a7.pdf, 2009, 13 pages.

(Continued)

*Primary Examiner* — Salvador E Rivas
(74) *Attorney, Agent, or Firm* — Harrity & Harrity, LLP

(57) ABSTRACT

A network device may receive a packet associated with a traffic flow of a session that includes session identification information for the session. The network device may determine to offload subsequent packets associated with the traffic flow using offloading indicators and/or a data model. The network device may store, using a data structure, the session identification information with other session identification information for other sessions that have been selected for offloading, and may provide the packet to a device. The network device may receive another packet associated with the traffic flow, and may determine to offload the other packet by determining that the other packet includes the session identification information. The device may offload the other packet to permit the other packet to traverse through the network device without the network device performing security checks on the other packet, and may provide the other packet to the device.

20 Claims, 10 Drawing Sheets

(51) Int. Cl.
*H04L 12/741* (2013.01)
*H04W 52/02* (2009.01)
*H04L 29/06* (2006.01)

(56) References Cited

U.S. PATENT DOCUMENTS

| | | |
|---|---|---|
| 9,288,101 B1 | 3/2016 | Dalal et al. |
| 9,571,354 B2 | 2/2017 | Annamalaisami et al. |
| 9,747,341 B2 | 8/2017 | Hegde et al. |
| 2006/0045111 A1* | 3/2006 | Sinha ................ H04L 49/90 370/412 |
| 2007/0014246 A1 | 1/2007 | Aloni et al. |
| 2015/0373107 A1* | 12/2015 | Chan ................ G06F 16/27 709/205 |
| 2016/0080337 A1* | 3/2016 | Pahl ................ H04L 63/045 713/171 |
| 2018/0034734 A1* | 2/2018 | Yin ................ H04L 47/2483 |

OTHER PUBLICATIONS

Yi Lu et al., "ElephantTrap: A low cost device for identifying large flows", 2007, 7 pages.

Juniper Networks, Inc., "Flow-Based and Packet-Based Processing Feature Guide for Security Devices", Mar. 12, 2018, 700 pages.

\* cited by examiner

INTELLIGENT OFFLOADING OF SERVICES FOR A NETWORK DEVICE

BACKGROUND

Services offloading refers to a packet forwarding solution whereby a packet is processed by a processor of a network device, without being processed by a security processing unit (SPU) of the network device (e.g., which may perform one or more security checks on the packet).

SUMMARY

According to some implementations, a network device may include one or more security processing units (SPUs), one or more memories, and one or more processors. The one or more processors may receive a packet associated with a traffic flow of a session, wherein the packet includes session identification information for the session. The one or more processors may determine, after receiving the packet, to offload subsequent packets associated with the traffic flow of the session using at least one of: a set of offloading indicators that are used to determine whether to offload the traffic flow of the session, or a data model that is used to generate recommendations indicating whether to offload the traffic flow of the session. The one or more processors may store, using a data structure, the session identification information for the session with other session identification information for other sessions that have been selected for offloading. The one or more processors may provide the packet to a device after storing the session identification information. The one or more processors may receive another packet associated with the traffic flow of the session. The one or more processors may determine to offload the other packet by determining that the other packet includes the session identification information for the session that has been selected for offloading. The one or more processors may offload the other packet to permit the other packet to traverse through the network device without the one or more SPUs performing one or more security checks on the other packet, and may provide the other packet to the device.

According to some implementations, a method may include receiving, by a network device, a packet associated with a traffic flow of a session, wherein the packet includes session identification information for the session. The method may include performing, by the network device, one or more security checks on the packet using one or more security processing units (SPUs). The method may include determining, by the network device, to offload subsequent packets associated with the traffic flow of the session using at least one of: a set of offloading indicators that are used to determine whether to offload the traffic flow of the session, or a data model that is used to generate recommendations indicating whether to offload the traffic flow of the session. The method may include providing, by the network device, the packet to a device after performing the one or more security checks on the packet. The method may include receiving, by the network device, another packet associated with the traffic flow of the session. The method may include offloading, by the network device, the other packet based on determining that the other packet includes the session identification of the session, wherein offloading the other packet allows the other packet to be routed through the network device without being subject to the one or more security checks. The method may include providing, by the network device, the other packet to the device.

According to some implementations, a non-transitory computer-readable medium may store instructions that include one or more instructions that, when executed by one or more processors of a device, cause the one or more processors to: receive a packet associated with a traffic flow of a session, wherein the packet includes session identification information for the session. The one or more instructions may cause the one or more processors to perform one or more security checks on the packet using one or more security processing units (SPUs). The one or more instructions may cause the one or more processors to determine, after receiving the packet, a set of offloading indicators that are to be used to determine whether to offload the traffic flow of the session. The one or more instructions may cause the one or more processors to determine to offload the traffic flow of the session based on analyzing at least one of: the set of offloading indicators that are used to determine whether to offload the traffic flow of the session, or a data model that is used to generate recommendations indicating whether to offload the traffic flow of the session. The one or more instructions may cause the one or more processors to store, using a data structure, the session identification information for the session with other session identification information for other sessions that have been selected for offloading. The one or more instructions may cause the one or more processors to provide the packet to a device after performing the one or more security checks on the packet. The one or more instructions may cause the one or more processors to receive another packet associated with the traffic flow of the session. The one or more instructions may cause the one or more processors to offload the other packet based on determining that the other packet includes the session identification information of the session, wherein offloading the other packet causes the other packet to bypass the one or more SPUs while traversing through a network device associated with the one or more processors. The one or more instructions may cause the one or more processors to provide the other packet to the device.

DETAILED DESCRIPTION

Figure 1A:
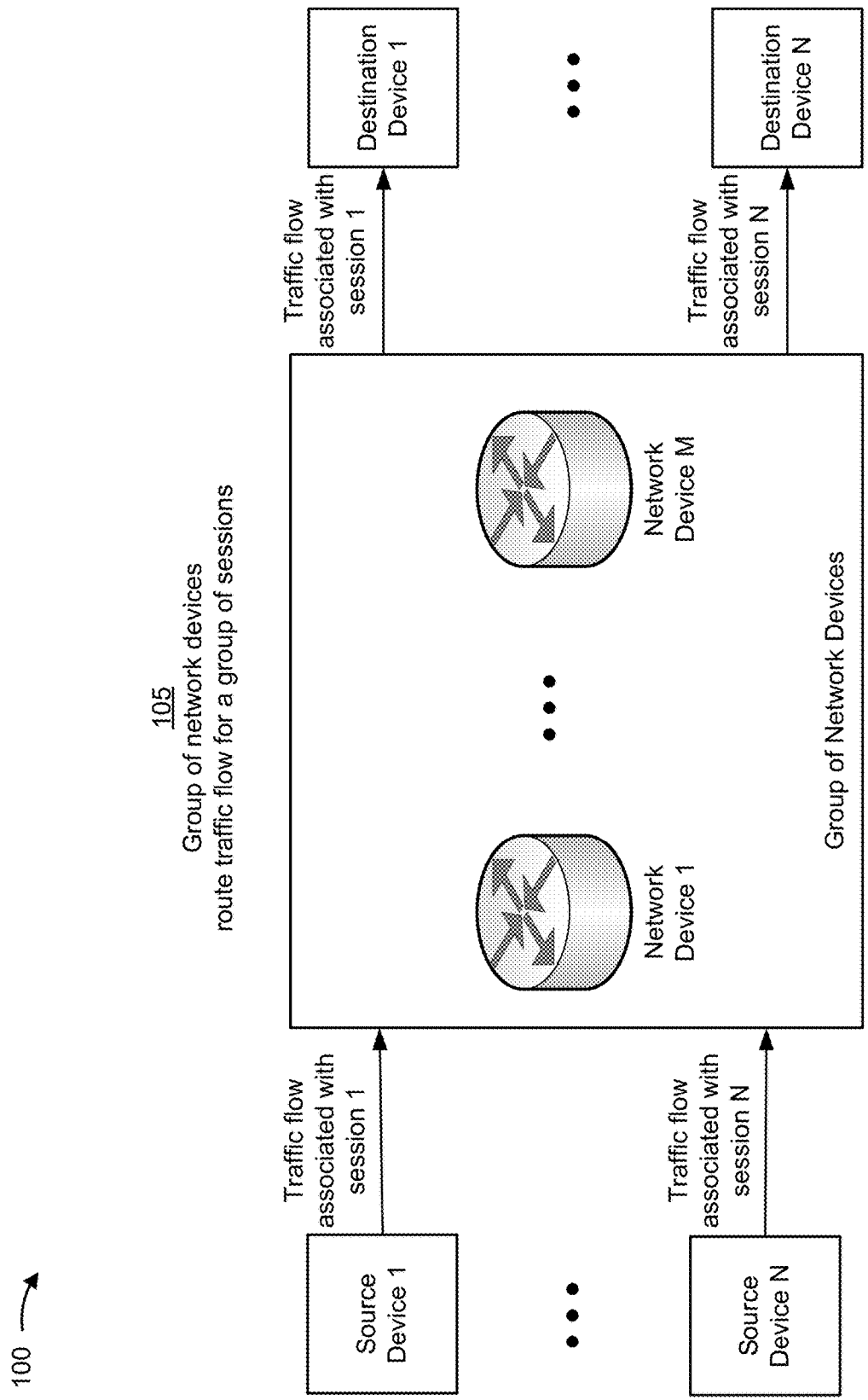
FIGS. 1A-1E are diagrams of an overview of an example implementation described herein.

The following detailed description of example implementations refers to the accompanying drawings. The same reference numbers in different drawings may identify the same or similar elements.

A vendor organization may use a network of devices to provide routing and forwarding services to client organizations. For example, the vendor organization may deploy a group of network devices such that the group of network device are able to manage routing and forwarding of packets associated with traffic flow of a session between a source device and a destination device.

In some cases, the network device may also perform one or more security checks on the packets before the packets are provided to the destination device. For example, the network device may include a security processing unit (SPU) that may be used to perform a policy look-up, execute a compliance test, run an intrusion prevention system (IPS), execute a web filtering technique, and/or the like. This may cause the network device to utilize an extensive amount of processing resources and/or may increase latency.

Services offloading may refer to a packet forwarding solution whereby the network device offloads traffic flow of sessions to reduce packet processing latency. For example, the network device may be configured with services offloading capabilities, such that the network device will forgo performing the one or more security checks on the packet, and simply route the packet to the destination device (e.g., thereby conserving processing resources and reducing latency).

In some cases, the network device may support traffic flow associated with tens of millions of sessions, hundreds of millions of sessions, or more. However, the network device may only support enough memory to offload a small portion of the traffic flow of the sessions (e.g., less than one percent, less than two percent, etc.). Additionally, once memory resources have been depleted, the network device may stop offloading packets until additional memory resources become available. Furthermore, if the network device offloads packets that may not need to be offloaded (e.g., offloading every packet associated with a high-throughput session), resources (e.g., processing resources, memory resources, etc.) are wasted which might otherwise be available for offloading packets associated with traffic flow of other sessions.

Some implementations described herein provide a network device to offload traffic flow of sessions by intelligently identifying sessions for offloading using a set of offloading indicators and/or machine learning techniques. For example, the network device may monitor traffic flow associated with a group of sessions. In this case, the network device may intelligently determine to offload traffic flow of particular sessions by using a set of offloading indicators and/or machine learning techniques to identify optimal sessions for offloading. To provide a few examples, the network device may identify optimal sessions for offloading by identifying sessions with high throughput, by identifying high-priority sessions (e.g., based on user preferences), by determining whether to offload a session based on a memory utilization rate of a line card supporting traffic flow of the session, and/or the like, as described further herein.

By intelligently offloading packets associated with the traffic flow of particular sessions, the network device efficiently and effectively utilizes resources (e.g., processing resources, network resources, memory resources, etc.). For example, intelligently identifying particular sessions for offloading allows the network device to effectively utilize resources by offloading packets that may not need to be processed by the SPU, thereby freeing up resources that may be used to process other packets that do need to be processed by the SPU.

Additionally, the network device may consider real-time memory utilization rates of one or more line cards, and may intelligently modify rules or machine learning models used to select sessions for offloading based on the real-time memory utilization rates. By using real-time data to select sessions for offloading, the network device ensures an efficient and effective utilization of resources. Furthermore, if the network device is presently offloading packets for a session, the network device may determine that the packets are no longer eligible for offloading, thereby conserving resources that might otherwise be used to offload packets that no longer need to be offloaded.

FIGS. 1A-1E are diagrams of an overview of an example implementation 100 described herein. For example, example implementation 100 may include group of source devices (shown as Source Device 1 through Source Device N), a group of network devices (shown as Network Device 1 through Network Device M), and a group of destination devices (shown as Destination Device 1 through Destination Device N). Some implementations described herein discuss a network device (e.g., shown as Network Device 1) performing one or more actions to intelligently identify particular sessions for offloading. In practice, the one or more actions may be performed by any number of the group of network devices.

As shown in FIG. 1A, and by reference number 105, an organization may deploy and use the group of network devices to route traffic flow for a group of sessions. For example, the group of source devices may provide traffic flow associated with a group of sessions (e.g., shown as Session 1 through Session N) to the group of network devices, and the group of network devices may route the traffic flow to the group of destination devices. The group of network devices may be part of a network, such as a multi-protocol label switching (MPLS) network, a wide area network (WAN), such as a software-defined (SD) WAN, and/or a similar type of network.

A session may be an interactive exchange of information between two or more communicating devices. The session may exchange traffic flow (e.g., packets) associated with a particular service. In some cases, the session may be a high-throughput session that involves transmission of large quantities of packets (e.g., a content streaming service, etc.). In other cases, the session may be a low-throughput session, such as a session used for establishing or transferring a domain name, a session providing a short message service (SMS), and/or the like.

In some implementations, the group of network devices may support high-volume traffic flow. For example, the group of network devices may support traffic flow associated with tens of millions of sessions, hundreds of millions of sessions, billions of sessions, or more.

In this way, the group of network devices route traffic flow for the group of sessions.

Figure 1B:
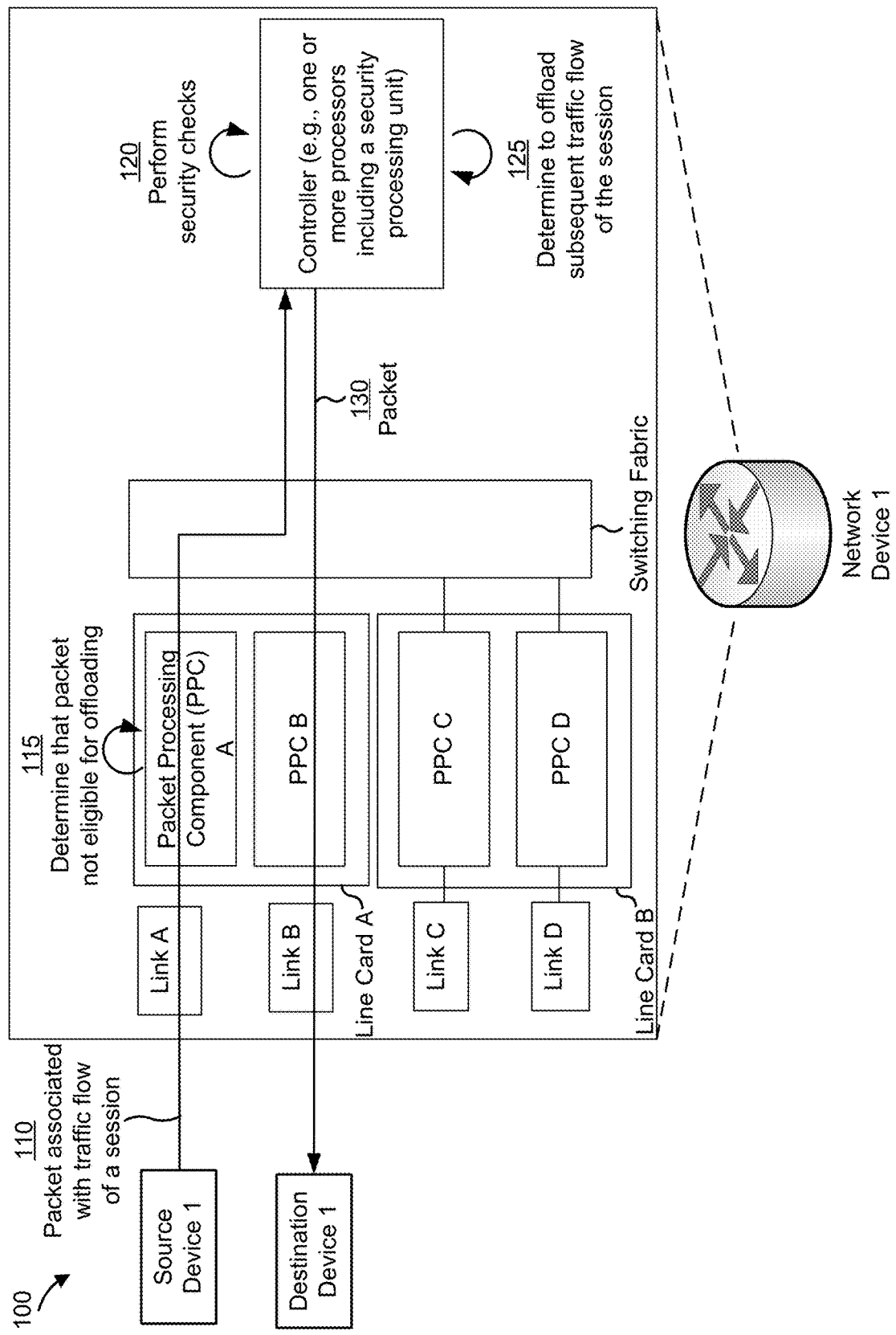

As shown in FIG. 1B, and by reference number 110, a network device (shown as Network Device 1) may receive a packet associated with traffic flow of a session. For example, a first packet processing component of the network device (shown as PPC A) may receive a packet via a first external link (shown as Link A).

While the figures illustrate the packet as being sent from a first source device (shown as Source Device 1) to the network device, it is to be understood that in practice, one or more intermediary devices may be between the first source device and the network device (e.g., a base station, another network device, etc.). Similarly, while the packet is depicted as being provided from the network device to a first destination device (shown as Destination Device 1), it is to be understood that in practice, one or more additional intermediary devices may be between the network device and the first destination device.

As shown by reference number 115, the network device (e.g., using the first packet processing component) may determine that the packet is not eligible for offloading. For example, the network device may process the header of the packet to identify session identification information associated with the session. The session identification information may include a source Internet protocol (IP) address, a source port identifier (e.g., a port number), a destination IP address, a destination port identifier, protocol information, and/or the like.

Additionally, a data structure may store session identification information for a list of sessions that have been selected for offloading. In this case, the network device may determine that the package is not eligible for offloading by searching (e.g., querying) the data structure to determine that the session identification information of the session is not included in the list of sessions that have been selected for offloading.

As shown by reference number 120, the network device (e.g., using a security processing unit that is part of a controller) may perform one or more security checks on the packet. For example, the first packet processing component of the network device may instruct the security processing unit to perform the one or more security checks based on determining that the packet is not eligible for offloading. The one or more security checks may be used to perform a policy look-up to make sure the packet is permitted by a particular policy, execute a compliance test to ensure that various aspects of the packet conform to particular protocols, run an intrusion prevention system (IPS), execute a web filtering technique, and/or the like.

In some implementations, the security processing unit of the network device may be a separate component from a controller that manages routing and forwarding of the device. In this case, the security processing unit may provide the packet to the controller to allow the controller to route the packet toward the destination device (e.g., as shown in reference number 130).

As shown by reference number 125, the network device (e.g., using the security processing unit) may determine to offload subsequent traffic flow of the session. For example, the network device may determine to offload subsequent traffic flow of the session using a set of offloading indicators. The network device may use the set of offloading indicators to identify whether the session is an optimal target for offloading.

In some implementations, the network device may identify the session as an optimal target for offloading if the session is a high-throughput session. A high-throughput session may be an optimal target for offloading because the network device may have to expend large volumes of processing resources to perform security checks on each of the packets associated with the traffic flow of the session. Furthermore, if a security check has already been performed on a first group of packets associated with a high-throughput session, repeatedly performing the same security check on subsequently received packets may waste processing resources despite the session already being identified as secure. In this case, the set of offloading indicators may include a first indicator that indicates a duration of the session, a second indicator that indicates a number of packets that have been transmitted during the session, a third indicator that indicates a type of session that is likely to have a threshold amount of throughput (e.g., a session that is streaming video content, a session associated with a particular user or group within an organization associated with the source device that frequently produces high-throughput sessions), and/or the like.

In some implementations, the network device may determine that the session is a high-throughput session by determining and processing the set of offloading indicators. For example, as the traffic flow of the session is actively being routed to the destination device, the network device may determine the set of offloading indicators. In this case, the network device may determine the set of offloading indicators by tracking a duration of the session, a number of packets that have been transmitted during the session, a session type, and/or the like, and may store the session information using a data structure.

Additionally, the network device may process the set of offloading indicators using a technique that analyzes data to identify high-throughput sessions. For example, the technique may be configured with a set of assumptions that the network device may use to determine whether the session is a high-throughput session.

The set of assumptions may include a first assumption indicating that the longer the duration of the session, the more likely the session is to be a high-throughput session, a second assumption indicating that the higher the number of packets that have been transmitted during the session, the more likely the session is to be a high-throughput session, a third assumption indicating that certain types of sessions are more (or less) likely to be high-throughput sessions (e.g., a session that is streaming video content is likely to be a high-throughput session, a session associated with a DNS query is less likely to be a high-throughput session, etc.) a fourth assumption indicating that particular users and/or devices may be associated with high-throughput sessions as a result of a type of work performed by those users and/or devices, and/or the like.

In this case, the network device may process the set of offloading indicators with the set of assumptions to generate an overall indicator value that may be used to determine whether to offload the traffic flow of the session. Additionally, the network device may compare the overall indicator value to a threshold overall indicator value (e.g., which may be configured) to determine whether the session is a high-throughput session.

As an example, the network device may query the data structure to obtain a set of offloading indicators indicating that the session has been active for thirty minutes, that over a million packets have been transmitted while the session has been active, and that the session is a content streaming session. In this example, the network device may process the set of offloading indicators using the set of assumptions to determine that the session is a high-throughput session, which may cause the network device to determine to offload subsequent traffic flow of the session.

In some implementations, the network device may assign weights to the set of offloading indicators based a likelihood of each offloading indicator being an indicator of a high-throughput session. In this case, the network device may use the weighted offloading indicators to generate the overall indicator value.

Additionally, or alternatively, the network device may identify the session as an optimal target for offloading based on user preferences that have identified the session as a high-priority session. For example, the network device may be configured with or may query user preferences information identifying one or more devices associated with entities that are to receive priority for offloading. An entity may be an individual (e.g., a chief executive officer (CEO) of the organization), a group of individuals, a department within the organization, and/or the like. In some cases, if the network device identifies user preferences information indicating that the session is a high-priority session, the network device may automatically determine to offload subsequent traffic flow of the session. In other cases, if the network device identifies user preferences information indicating that the session is a high-priority session, the network device may use the user preferences information as a factor in determining whether to offload the traffic flow of the session (e.g., in conjunction with the offloading indicators described above).

Additionally, or alternatively, the network device may determine to offload the subsequent traffic flow of the session using a data model. For example, the network device may train a data model with historical information, such as historical offloading indicators, historical information indicating whether traffic flow of particular sessions was offloaded, historical information indicating whether the traffic flow of the particular sessions should have been offloaded, and/or the like. In this case, the network device may provide, as input to the trained data model, session identification information and/or the set of offloading indicators for the session, which may cause the data model to output a value associated with a recommendation of whether to offload the traffic flow of the session.

In some implementations, the network device may train the data model using one or more machine learning techniques. For example, the network device may process the historical information using a supervised learning technique, a neural network, a Bayesian Network, a decision tree, a clustering technique, an unsupervised learning technique, and/or the like.

In some cases, the network device may train the data model to identify trends that may be used to process subsequently received data. For example, by processing the historical information using a supervised learning technique, the network device may determine that given a set of particular inputs, there is a high (or low) probability of the session being a high-throughput session. This may allow the network device to use the output of the data model to determine whether to offload the traffic flow of the session.

In some implementations, the network device may receive a data model that has been trained by another device. For example, a device associated with a software developer may be used to train the data model, and the trained data model may be provided to the network device.

As shown by reference number 130, the network device (e.g., using the controller) may route the packet toward the destination device. For example, the network device may identify the destination IP address and/or the destination port identifier for the session, and may use the destination IP address and/or the destination port identifier to route the packet (e.g., the packet is shown as being routed through a second packet processing component, such as PPC B, and being routed out of the network device via a second external link, such as Link B).

In this way, the network device intelligently identifies the session as an optimal session for offloading.

Figure 1C:
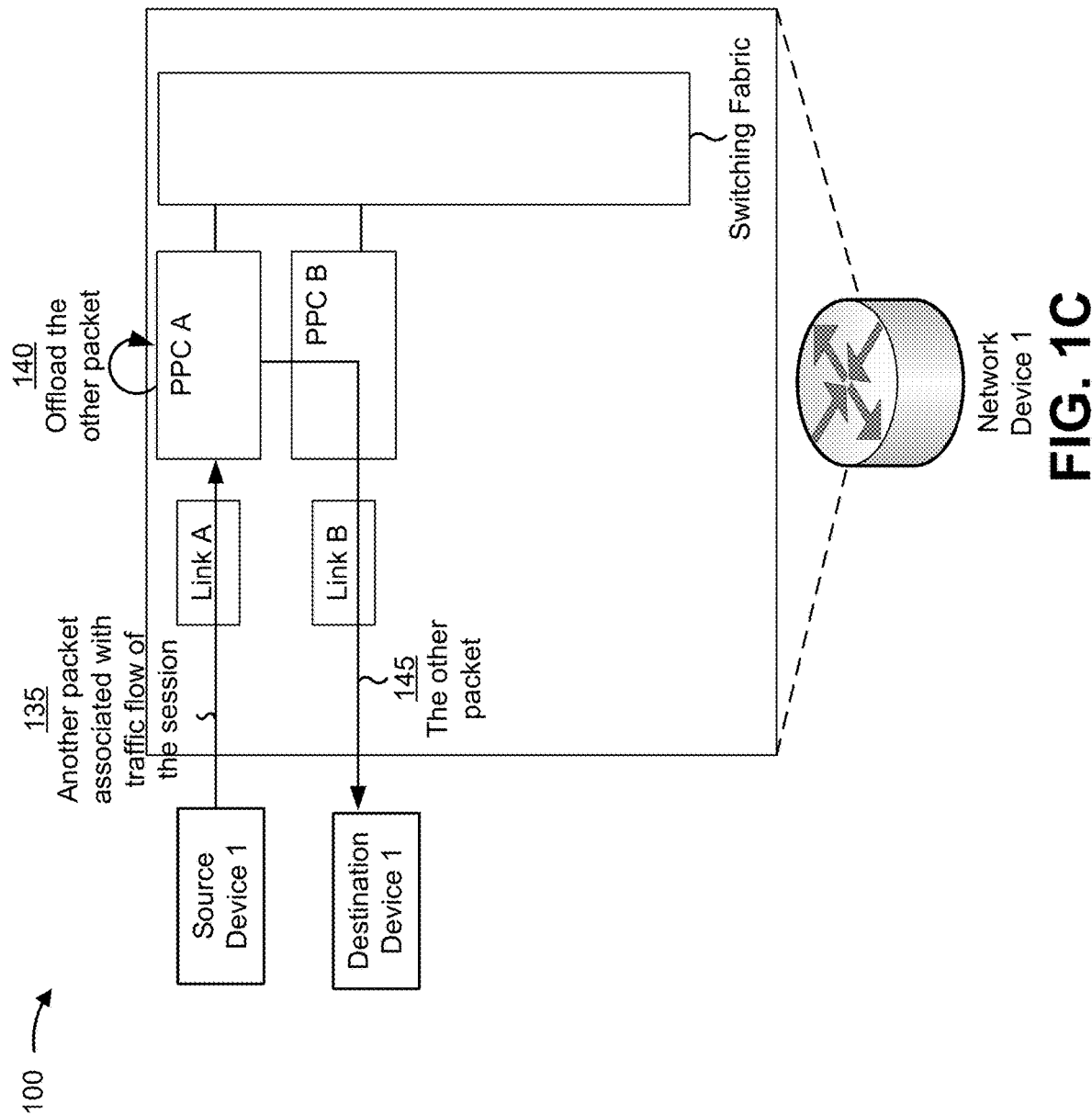

As shown in FIG. 1C, and by reference number 135, the network device may receive another packet associated with the traffic flow of the session. As shown by reference number 140, the network device (e.g., using the first packet processing component) may offload the other packet. For example, the network device may process the packet to obtain the session identification information, as described elsewhere here. In this case, the network device may search the data structure that stores the session identification information for the list of sessions that have been selected for offloading, and may determine that the session identification information for the other packet matches the session identification information stored using the data structure.

As such, the network device may offload the packet. The network device may offload by packet by modifying an intra-device route that the other packet is to take before being routed to other devices (e.g., an intermediary device, the first destination device, etc.). For example, the network device may modify an intra-device route such that the other packet does not traverse through the switching fabric, the security processing unit, and/or the like. This allows the other packet to be routed without the network device expending resources by performing the one or more security checks on the other packet.

It is to be noted that in some cases, while offloading the packet may allow the other packet to be routed without resources being expended on the one or more security checks, in some cases, a minimal number of security checks may still be performed on the other packet (and all subsequently offloaded packets). For example, the network device may still maintain a firewall state, may still do basic checks on the header of the other packet to make sure the packet is safe, and/or the like.

As shown by reference number 145, the network device may route the other packet to the first destination device. For example, the network device may use the session identification information to identify a routing and forwarding path for the other packet, and may route the other packet through the network device toward the first destination device. As shown as an example, the other packet may be routed by the first destination device by traversing through a second packet processing component (shown as PPC B) and a second external port (shown as Link B).

In this way, the network device offloads traffic flow associated with the session. By offloading packets associated with the traffic flow of the session, the network device efficiently and effectively utilizes resources (e.g., processing resources, network resources, memory resources, etc.). For example, offloading the traffic flow of the session effectively utilizes resources by offloading packets that may not need to be processed by the SPU, thereby freeing up resources that may be used to process other packets that do need to be processed by the SPU.

Figure 1D:
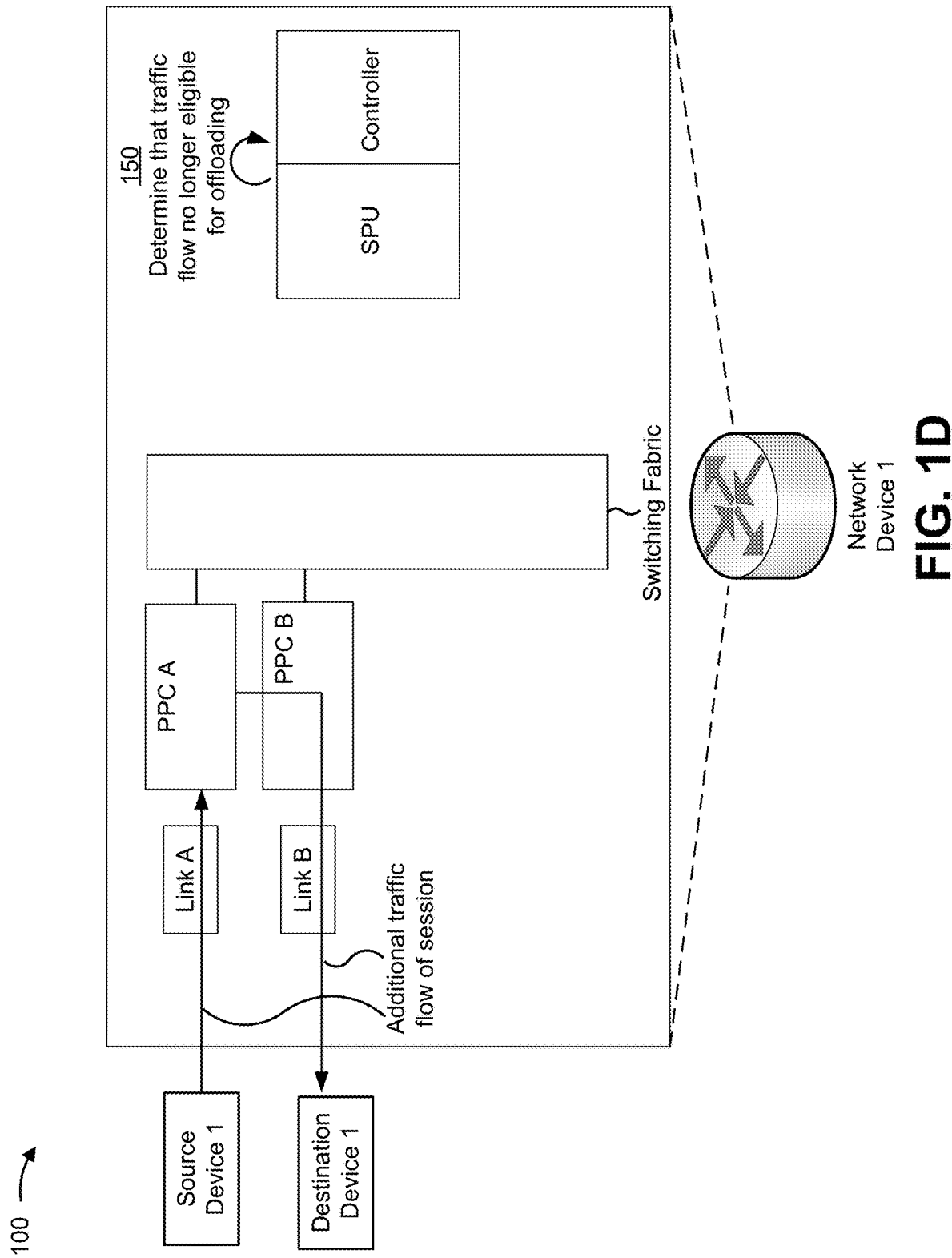

As shown in FIG. 1D, and by reference number 150, the network device may determine that the traffic flow of the session is no longer eligible for offloading. For example, the network device may periodically monitor the set of offloading indicators (e.g., at set time periods, based on another trigger, etc.), and may use the set of offloading indicators and/or the data model to determine that the traffic flow is no longer eligible for offloading, in a manner similar to that described above.

As an example, over time, the traffic flow of the session may decrease, such that the session is no longer a high-throughput session. As such, the network device may determine that the traffic flow is no longer eligible for offloading based on determining that the session is no longer a high-throughput session. As another example, the session may have been offloaded based on the network device identifying the session as a high-priority session. However, the user preferences may have indicated that the session only needs to be a high-priority session during a particular time period (e.g., during business hours, in the morning, in the afternoon, etc.). In this case, the network device may determine that traffic flow is no longer eligible for offloading based on determining that a current time period is not within a time period indicated by the user preferences.

In this way, the network device periodically checks to determine whether the session is still an optimal session for offloading. This causes the network device to efficiently and effectively utilize resources by periodically verifying that sessions are still optimal sessions for offloading.

Figure 1E:
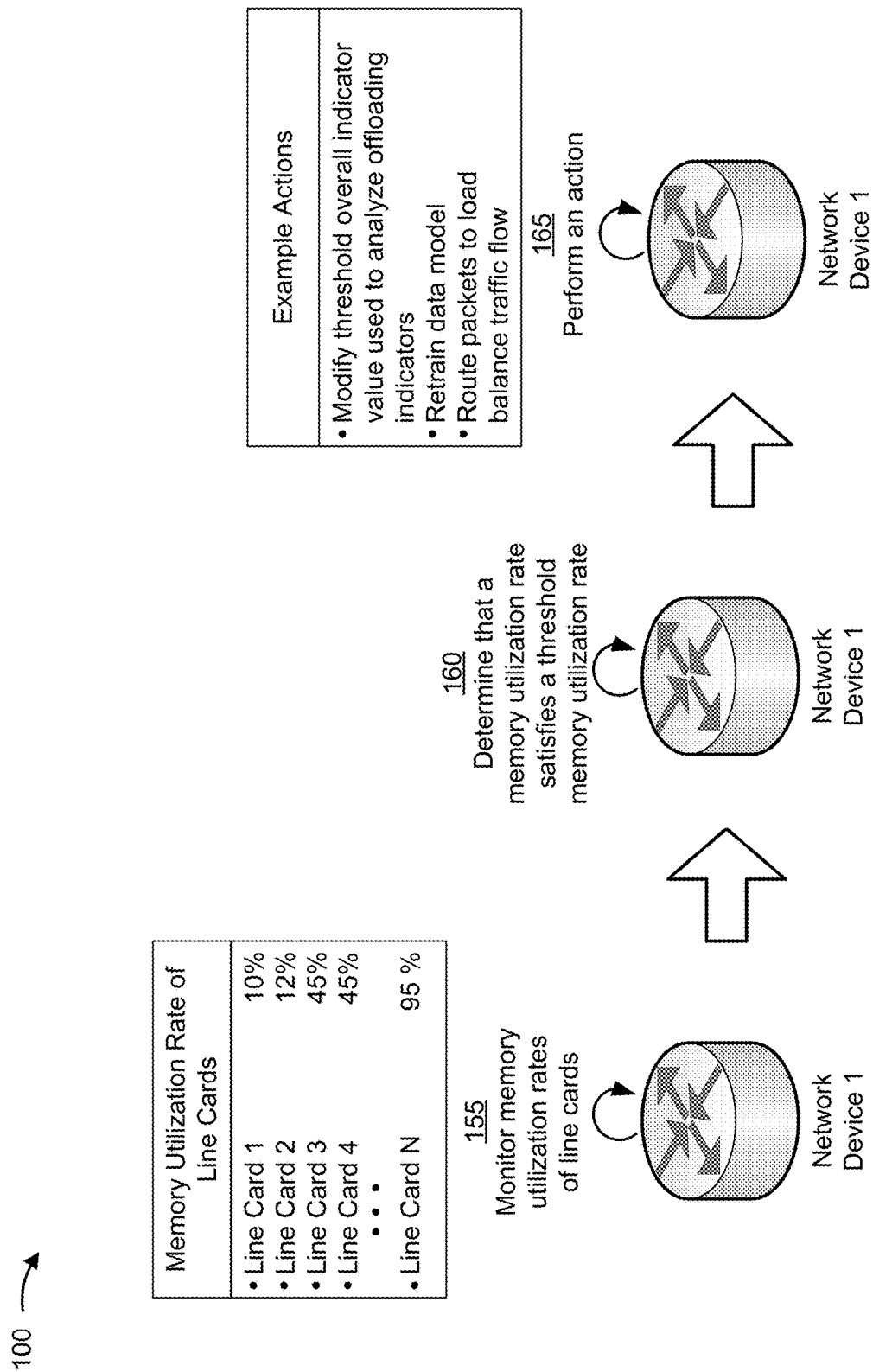

As shown in FIG. 1E, the network device may perform an action associated with load balancing the traffic flow of the session or may perform an action associated with improving accuracy of a technique or model used to determine whether to offload the traffic flow. As shown by reference number 155, the network device may monitor one or more memory utilization rates of line cards of the network device. For example, the network device may monitor the one or more memory utilization rates periodically over a time interval and/or based one or more other triggers. In some cases, the network device may be a type of network device that does not include a line card. In this case, the network device may monitor one or more memory utilization rates associated with another type of circuit used to support the packet processing components (e.g., an application-specific integrated circuit (ASIC)).

As shown by reference number 160, the network device may determine that a memory utilization rate satisfies a threshold memory utilization rate. For example, the network device may compare the one or more memory utilization rates and a threshold memory utilization rate to determine that a particular memory utilization rate satisfies the threshold memory utilization rate.

In this case, if a particular memory utilization rate of a line card satisfies a threshold memory utilization rate (e.g., exceeds 95%, exceeds 97%, drops below 5%, drops below 3%, etc.), then the network device may, as shown by reference number 165, perform an action associated with load balancing the traffic flow of the session or may perform an action associated with improving accuracy of a technique or model used to determine whether to offload the traffic flow. For example, the network device may modify a threshold overall value used to analyze the set of offloading indicators, retrain the data model, route packets to load balance the traffic flow, and/or the like, as each described below.

In some implementations, the network device may modify the threshold overall indicator value used to analyze the set of offloading indicators. For example, if a particular memory utilization rate of a line card satisfies the threshold memory utilization rate, the network device may modify (e.g., increase, decrease, etc.) the threshold overall indicator value used to analyze the set of offloading indicators, such that the threshold overall indicator value may be used to decrease a number of sessions that are selected for offloading due to lack of available memory (or increase a number of sessions that are selected for offloading due to an excess of available memory).

As an example, assume the network device determines whether to select traffic flow for offloading using a scale of overall indicator values between 1 and 10, where 10 is a high likelihood of the session being a high-throughput session, and 1 is a low likelihood of the session being a high-throughput session. Further assume the network device is configured with a threshold overall threshold value of 7. In this example, the network device might analyze the set of offloading indicators to determine an overall indicator value (e.g., which may be a value between a 1 and a 10), and may compare the overall indicator value to the threshold overall indicator value of 7. Further assume the network device determines that a particular line card has a memory utilization rate of 96%, and that the memory utilization rate satisfies a threshold memory utilization rate of 95%. In this case, the network device may modify the overall threshold indicator value (e.g., by increasing the value from 7 to 9), which may decrease a number of sessions selected for offloading, and reduce chances of the line cards memory reaching a memory utilization rate of 100%.

Additionally, or alternatively, the network device may retrain the data model. For example, if a particular memory utilization rate of a line card satisfies the threshold memory utilization rate, the network device may retrain the data model by modifying one or more values used to analyze the set of offloading indicators. Modifying the one or more values may allow the data model to process offloading indicators such that there is a decrease in a number of sessions selected for offloading (or an increase in a number of sessions selected for offloading).

In some implementations, the network device may route packets to load balance the traffic flow. For example, if a particular memory utilization rate of a line card satisfies the threshold memory utilization rate, the network device may route at least a portion of the traffic flow of particular sessions associated with the line card. By load balancing the line cards, the network device ensures that the technique used to analyze the set of offloading indicators and/or the data model are still able to be effective metrics for identifying optimal sessions for offloading.

In this way, the network device continues to intelligently identify optimal sessions for offloading.

As indicated above, FIGS. 1A-1E are provided merely as an example. Other examples are possible and may differ from what was described with regard to FIGS. 1A-1E. For example, there can be additional devices and/or networks, fewer devices and/or networks, different devices and/or networks, or differently arranged devices and/or networks than those shown in FIGS. 1A-1E. Furthermore, two or more devices shown in FIGS. 1A-1E can be implemented within a single device, or a single device shown in FIGS. 1A-1E can be implemented as multiple, distributed devices. Additionally, or alternatively, a set of devices (e.g., one or more devices) of example environment 100 can perform one or more functions described as being performed by another set of devices of example environment 100.

Figure 2:
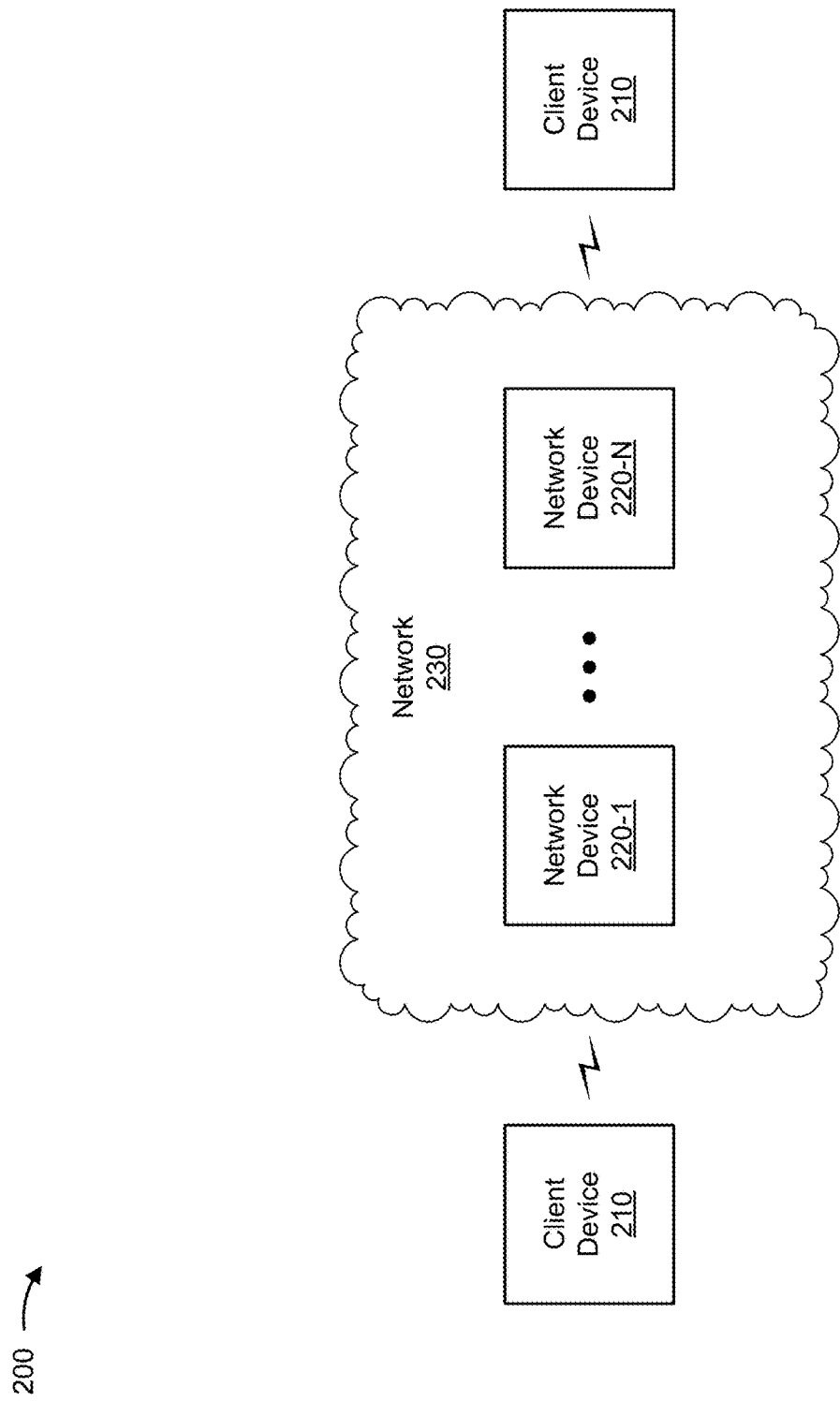
FIG. 2 is a diagram of an example environment in which systems and/or methods, described herein, may be implemented.

As shown in FIG. 2, environment 200 may include one or more client devices 210, one or more network devices 220-1 through 220-N(N≥1) (hereinafter referred to collectively as "network devices 220", and individually as "network device 220"), and a network 230. Devices of environment 200 may interconnect via wired connections, wireless connections, or a combination of wired and wireless connections.

Client device 210 includes one or more devices capable of receiving, processing and/or providing network traffic in a manner described herein. For example, client device 210 may include a computing and/or communication device (e.g., a desktop computer, a laptop computer, a mobile phone, etc.), a traffic transfer device, such as a router, a gateway, a switch, a firewall, a hub, a bridge, a reverse proxy, a server (e.g., a proxy server, a server executing a virtual machine, etc.), a load balancer, and/or a similar type of device. Additionally, or alternatively, client device 210 may include an endpoint device that is a source or a destination for network traffic. For example, client device 210 may include a computer, a server device, a mobile device, and/or a similar type of device. In some implementations, client device 210 may receive packets associated with traffic flow of a session from other client devices 210 and/or may provide the packets to the other client devices 210 via network 230 (e.g., by routing packets using network device(s) 220 as an intermediary). In some implementations, client device 210 may include a processor, a memory, a storage component, an input component, an output component, and/or a communication interface.

Network device 220 includes one or more devices capable of receiving, processing, storing, routing, and/or providing traffic in a manner described herein. For example, network device 220 may include a router, such as a label switching router (LSR), a label edge router (LER), an ingress router, an egress router, a provider router (e.g., a provider edge router, a provider core router, etc.), a virtual router, and/or the like. Additionally, or alternatively, network device 220 may include a gateway, a switch, a firewall, a hub, a bridge, a reverse proxy, a server (e.g., a proxy server, a cloud server, a data center server, etc.), a load balancer, and/or a similar device. In some implementations, network device 220 may be a physical device implemented within a housing, such as a chassis. In some implementations, network device 220 may be a virtual device implemented by one or more computer devices of a cloud computing environment or a data center.

In some implementations, network device 220 may receive packets associated with traffic flow of a session from client device 210 and/or from another network device 220. In some implementations, network device 220 may provide the packets associated with the traffic flow of the session to another client device 210 and/or to an additional network device 220.

Network 230 includes one or more wired and/or wireless networks. For example, network 230 may include a cellular network (e.g., a fifth generation (5G) network, a fourth generation (4G) network, such as a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
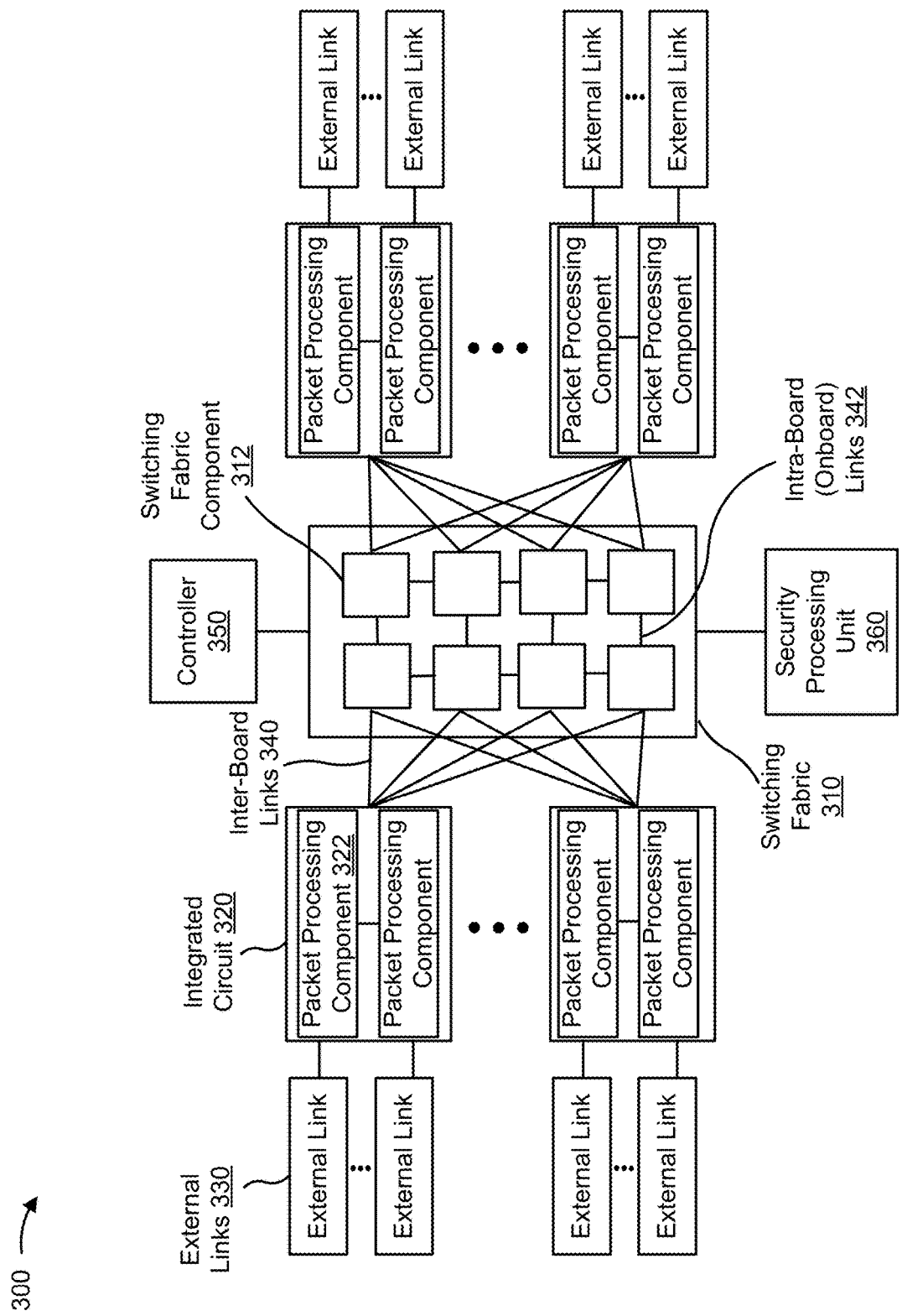
FIG. 3 is a diagram of example components of one or more devices of FIG. 2.

FIG. 3 is a diagram of example components of a device 300. Device 300 may correspond to network device 220. In some implementations, network device 220 may include one or more devices 300 and/or one or more components of device 300.

As shown in FIG. 3, device 300 may include a switching fabric 310, a set of switching fabric components 312, a set of integrated circuits 320 that support a set of packet processing components 322, a set of external links 330, a set of inter-board links 340, a set of intra-board (onboard) links 342, and/or a controller 350. In some implementations, packets between switching fabric 310 and controller 350 may be provided and/or received through a single internal link. In some implementations, traffic between switching fabric 310 and controller 350 may be provided and/or received through a set of inter-board links 340, where each inter-board link 340 may be designated for a subset of external links 330 and/or a subset of integrated circuits 320. In some implementations, integrated circuit 320 may use a set of inter-board links 340 to communicate with one or more corresponding planes of a switching fabric 310.

Switching fabric 310 interconnects external links 330 via integrated circuits 320. In some implementations, switching fabric 310 may be implemented using one or more switching fabric components 312 (e.g., one or more crossbars, one or more busses, one or more shared memories, and/or one or more planes). In some implementations, switching fabric components 312 may be connected using intra-board (on-board) links 342.

Integrated circuits 320 include (and/or support) one or more packet processing components 322. In some implementations, integrated circuits 320 may include a line card (i.e., a modular electronic circuit designed to fit on a printed circuit board (PCB)) and may include one or more packet processing components 322. Additionally, or alternatively, integrated circuits 320 may include an application-specific integrated circuit (ASIC). Additionally, or alternatively, integrated circuits 320 may include a different type of circuit.

In some implementations, integrated circuits 320 may include (and/or support) a memory, such as a random access memory (RAM), a read only memory (ROM), a cache memory, and/or another type of dynamic or static storage device (e.g., a flash memory, a magnetic memory, an optical memory, etc.) that stores information and/or instructions (e.g., information relating to processing performed by security processing unit 360). In some implementations, the memory may be part of packet processing component 322. In some implementations, the memory may be external to packet processing component 322.

Packet processing component 322 includes one or more processors to process packets, and may process incoming packets, such as by performing data link layer encapsulation or decapsulation. In some implementations, packet processing component 322 may receive a packet from switching fabric 310, may process the packet, and may output the processed packet to an appropriate external link 330 connected to packet processing component 322. Additionally, or alternatively, packet processing component 322 may receive a packet from external link 330, may process the packet, and may output the processed packet to switching fabric 310 for transfer to controller 350 and/or to another external link 330 (e.g., via the same packet processing component 322 or a different packet processing component 322). In some implementations, packet processing components 322 may receive information from security processing unit 360 or controller 350, such as information relating to routing and forwarding table lookups, information relating to security checks performed by security processing unit 360, and/or the like.

External link 330 is a point of attachment for physical links (e.g., a port) or virtual links (e.g., a virtual local area network (VLAN)), and may be a point of ingress and/or egress for incoming and/or outgoing traffic, such as packets. In some implementations, a single integrated circuit 320 may be connected to multiple external links 330. In some implementations, a single integrated circuit 320 may be connected to a single external link 330. External link 330 may permit communication between a first network device 220 and a second network device 220 that is a neighbor of the first network device 220. External link 330 may store packets (e.g., in a buffer) and/or may schedule packets for transmission on physical output links. External link 330 may support data link layer encapsulation or decapsulation and/or a variety of higher-level protocols.

Inter-board link 340 is a path that allows integrated circuit 320 and/or controller 350 to communicate with switching fabric 310. Inter-board link 340 may include, for example, a wired or wireless path, such as a fiber-optic path, an electrical path, a virtual path, and/or the like. In some implementations, there may be multiple inter-board links 340 between a single packet processing component 322 and switching fabric 310. In some implementations, there may be a single inter-board link 340 between controller 350 and switching fabric 310. Intra-board (onboard) link 342 is a path that allows interconnection between packet processing components 322 and/or switching fabric components 312 (e.g., a physical connection, a virtual connection, etc.).

Controller 350 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 350 may include one or more processors that may be programmed to perform a function. In some implementations, controller 350 may include a group of virtual devices that each includes one or more processors.

In some implementations, controller 350 may include a RAM, a ROM, and/or another type of dynamic or static storage device (e.g., a flash memory, a magnetic memory, an optical memory, etc.) that stores information and/or instructions for use by controller 350.

In some implementations, controller 350 may communicate with other devices, networks, and/or systems connected to device 300 to exchange information regarding network topology. Controller 350 may create routing tables based on the network topology information, create forwarding tables based on the routing tables, and forward the forwarding tables to packet processing component 322, such as for use in performing route lookups for incoming and/or outgoing packets.

Controller 350 may perform one or more processes described herein. Controller 350 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or a storage component associated with controller 350 from another computer-readable medium or from another device via a communication interface. When executed, software instructions stored in a memory and/or storage component associated with controller 350 may cause controller 350 to perform one or more processes described herein. Additionally, or alternatively, hardwired circuitry may be used in place of or in combination with software instructions to perform one or more processes described herein. Thus, implementations described herein are not limited to any specific combination of hardware circuitry and software. In some implementations, one or more processes described herein as being performed by packet processing component 322 may be performed by controller 350. In some implementations, one or more processes described herein as being performed by controller 350 may be performed by packet processing component 322.

Security processing unit 360 includes one or more components and/or elements to receive, generate, store, and/or provide information relating to one or more security checks. For example, security processing unit 360 may include a memory, one or more processors, an intrusion prevention system (IPS), a temper detection and response element, a firewall element, a security register, and/or the like. In some implementations, security processing unit 360 may perform one or more security checks based on a trigger (e.g., based on receiving a packet from packet processing component 322, based on receiving instructions from packet processing component 322 or controller 350, etc.). The one or more security checks may be used to perform a policy look-up, execute a compliance test, run an IPS, execute a web filtering technique, and/or the like. In some implementations, security processing unit 360 may be part of controller 350 (e.g., as shown in FIGS. 1A-1E).

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
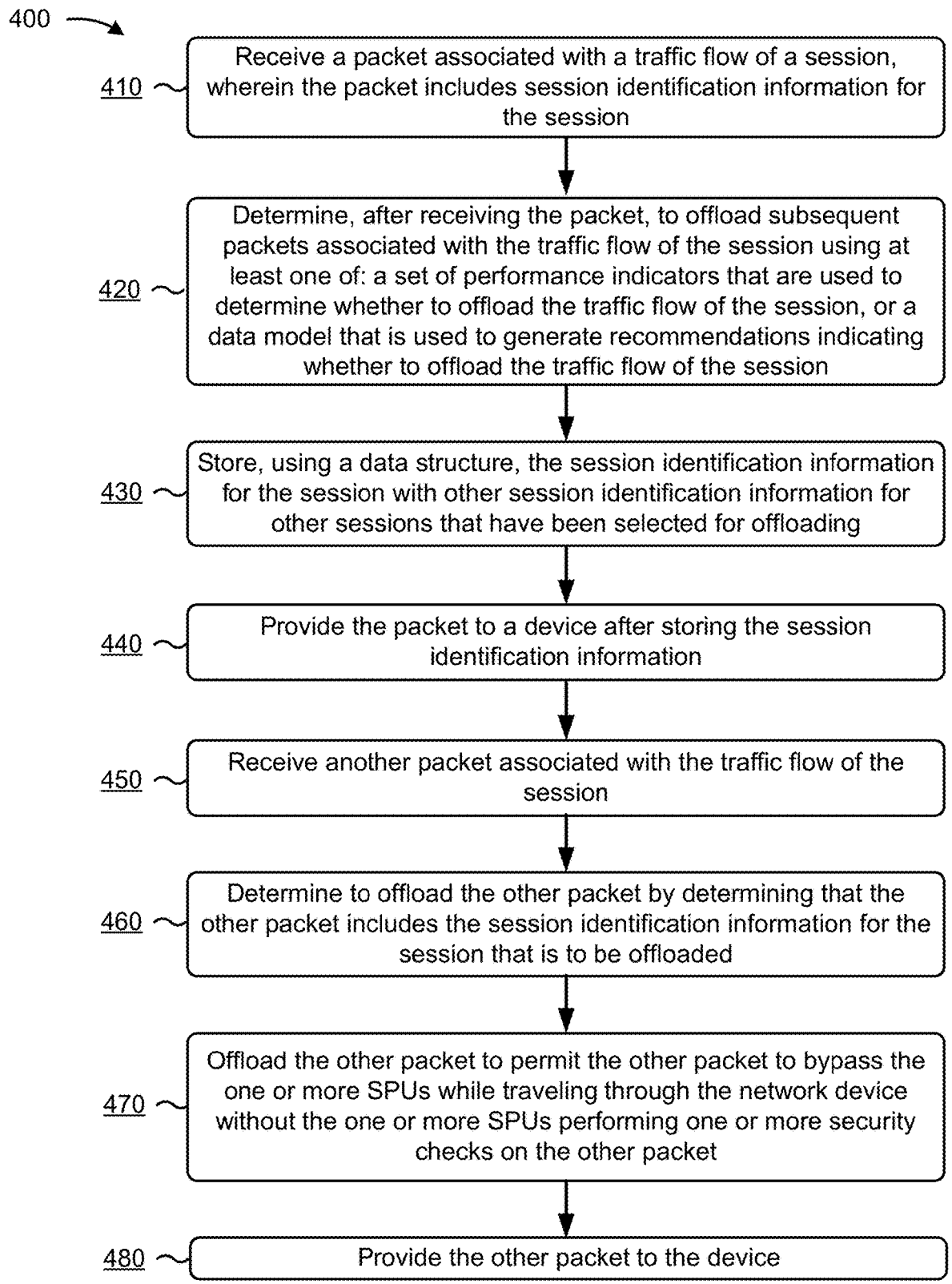
FIGS. 4-6 are flowcharts of an example process for offloading traffic flow of particular sessions by using a set of offloading indicators and/or machine learning techniques to identify the particular sessions as optimal sessions for offloading.

FIG. 4 is a flow chart of an example process 400 for offloading traffic flow of particular sessions by using a set of offloading indicators and/or machine learning techniques to identify the particular sessions as optimal sessions for offloading. In some implementations, one or more process blocks of FIG. 4 may be performed by a network device (e.g., network device 220). In some implementations, one or more process blocks of FIG. 4 may be performed by another device or a group of devices separate from or including the network device, such as a client device (e.g., client device 210).

As shown in FIG. 4, process 400 may include receiving a packet associated with a traffic flow of a session, wherein the packet includes session identification information for the session (block 410). For example, the network device (e.g., using packet processing component 322, external link 330, controller 350, and/or the like) may receive a packet associated with a traffic flow of a session, described above with respect to FIGS. 1A-1E. In some implementations, the packet may include session identification information for the session.

As further shown in FIG. 4, process 400 may include determining, after receiving the packet, to offload subsequent packets associated with the traffic flow of the session using at least one of: a set of offloading indicators that are used to determine whether to offload the traffic flow of the session, or a data model that is used to generate recommendations indicating whether to offload the traffic flow of the session (block 420). For example, the network device (e.g., using packet processing component 322, controller 350, and/or the like) may determine, after receiving the packet, to offload subsequent packets associated with the traffic flow of the session using at least one of: a set of offloading indicators that are used to determine whether to offload the traffic flow of the session, or a data model that is used to generate recommendations indicating whether to offload the traffic flow of the session, as described above with respect to FIGS. 1A-1E.

As further shown in FIG. 4, process 400 may include storing, using a data structure, the session identification information for the session with other session identification information for other sessions that have been selected for offloading (block 430). For example, the network device (e.g., using packet processing component 322, controller 350, and/or the like) may store, using a data structure, the session identification information for the session with other session identification information for other sessions that have been selected for offloading, as described above with respect to FIGS. 1A-1E.

As further shown in FIG. 4, process 400 may include providing the packet to a device after storing the session identification information (block 440). For example, the network device (e.g., using packet processing component 322, external link 330, controller 350, and/or the like), and/or the like) may provide the packet to a device (e.g., the client device, another network device, etc.) after storing the session identification information, as described above with respect to FIGS. 1A-1E.

As further shown in FIG. 4, process 400 may include receiving another packet associated with the traffic flow of the session (block 450). For example, the network device (e.g., using packet processing component 322, external link 330, controller 350, and/or the like) may receive another packet associated with the traffic flow of the session, as described above with respect to FIGS. 1A-1E.

As further shown in FIG. 4, process 400 may include determining to offload the other packet by determining that the other packet includes the session identification information for the session that has been selected for offloading (block 460). For example, the network device (e.g., using packet processing component 322, controller 350, and/or the like) may determine to offload the other packet by determining that the other packet includes the session identification information for the session that has been selected for offloading, as described above with respect to FIGS. 1A-1E.

As further shown in FIG. 4, process 400 may include offloading the other packet to permit the other packet to traverse through the network device without the one or more SPUs performing one or more security checks on the other packet (block 470). For example, the network device (e.g., using packet processing component 322, controller 350, and/or the like) may offload the other packet to permit the other packet to traverse through the network device without the one or more SPUs performing one or more security checks on the other packet, as described above with respect to FIGS. 1A-1E.

As further shown in FIG. 4, process 400 may include providing the other packet to the device (block 480). For example, the network device (e.g., using packet processing component 322, external link 330, controller 350, and/or the like) may provide the other packet to the device, as described above with respect to FIGS. 1A-1E.

Process 400 may include additional implementations, such as any single implementation or any combination of implementations described below and/or in connection with one or more other processes described elsewhere herein.

In some implementations, the session may be part of a group of sessions, and a number of sessions in the group of sessions may be at least ten million sessions, at least fifty million sessions, at least one hundred million sessions, or at least five hundred million sessions.

In some implementations, when determining to offload the subsequent packets associated with the session, the network device may obtain or determine the set of offloading indicators. The set of offloading indicators may include a first indicator that indicates a duration of the session, a second indicator that indicates a number of packets that have been transmitted during the session, a third indicator that indicates a type of session that is likely to have a threshold amount of throughput, and/or a fourth indicator that indicates whether a memory utilization rate associated with a line card of the network device satisfies a threshold memory utilization rate. Additionally, the network device may process the set of offloading indicators to determine an overall indicator value that is to be used to determine whether to select the traffic flow of the session for offloading. Furthermore, the network device may determine to offload the subsequent packets based on the overall indicator value satisfying a threshold overall indicator value, wherein the threshold overall indicator value is used as an indicator of when particular traffic flow is to be offloaded.

In some implementations, the network device may include one or more line cards, and may determine, before determining to offload the traffic flow of the session, that a memory utilization rate associated with a first line card of the one or more line cards satisfies a threshold memory utilization rate. The traffic flow of the session may traverse through the first line card. Additionally, the network device may dynamically modify, based on determining that the memory utilization rate satisfies the threshold memory utilization rate, a threshold overall indicator value that is to be used to determine whether to offload the subsequent packets associated with the traffic flow of the session. In some implementations, when determining to offload the subsequent packets associated with the traffic flow of the session, the network device may use the threshold overall indicator value when processing the set of offloading indicators to determine to offload the subsequent packets associated with the traffic flow of the session.

In some implementations, the network device may identify user preferences information associated with the session after performing one or more security checks on the packet. The user preferences information may identify one or more devices associated with an entity that are to receive priority for offloading. Additionally, the network device may determine to offload the subsequent packets based on the traffic flow being received from a particular device of the one or more devices that is to receive priority for offloading.

In some implementations, when determining to offload the subsequent packets associated with the session, the network device may provide the set of offloading indicators as input to the data model to cause the data model to output one or more values associated with a recommendation to select the traffic flow of the session for offloading. Additionally, the network device may determine to offload the subsequent packets based on the one or more values associated with the recommendation to select the traffic flow of the session for offloading.

In some implementations, the network device may include one or more line cards, and may monitor, after providing the other packet to the device, one or more memory utilization rates associated with the one or more line cards. Additionally, the network device may determine that a memory utilization rate, of the one or more memory utilization rates, that is associated with a line card, of the one or more line cards, satisfies a threshold memory utilization rate. The traffic flow of the session may be associated with the line card. Additionally, the network device may route a portion of the traffic flow of the session to other line cards based on determining that the memory utilization rate satisfies the threshold memory utilization rate.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
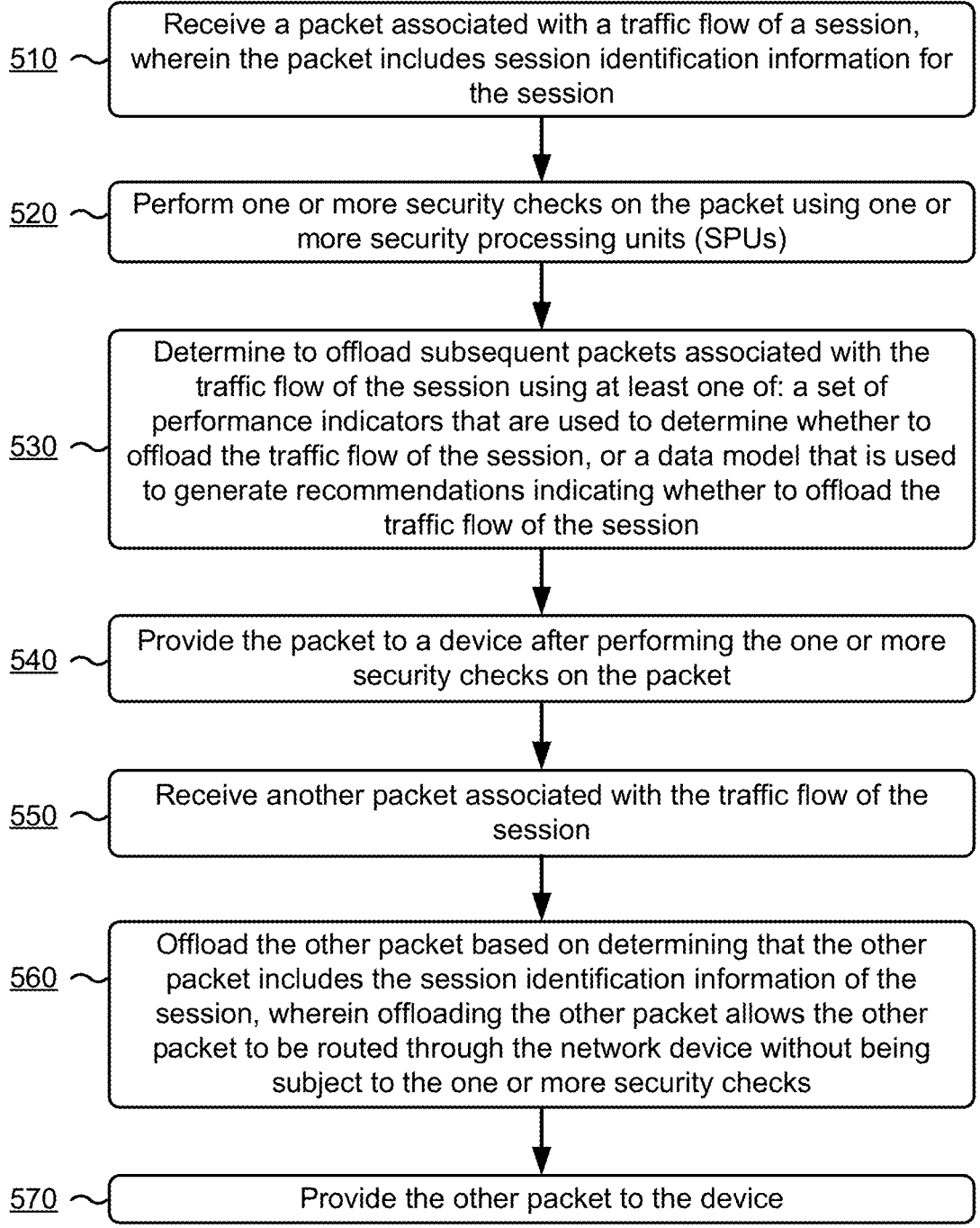

FIG. 5 is a flow chart of an example process 500 for offloading traffic flow of particular sessions by using a set of offloading indicators and/or machine learning techniques to identify the particular sessions as optimal sessions for offloading. In some implementations, one or more process blocks of FIG. 5 may be performed by a network device (e.g., network device 220). In some implementations, one or more process blocks of FIG. 5 may be performed by another device or a group of devices separate from or including the network device, such as a client device (e.g., client device 210).

As shown in FIG. 5, process 500 may include receiving a packet associated with a traffic flow of a session, wherein the packet includes session identification information for the session (block 510). For example, the network device (e.g., using packet processing component 322, external link 330, controller 350, and/or the like) may receive a packet associated with a traffic flow of a session, as described above with respect to FIGS. 1A-1E. In some implementations, the packet may include session identification information for the session.

As further shown in FIG. 5, process 500 may include performing one or more security checks on the packet using one or more security processing units (SPUs) (block 520). For example, the network device (e.g., using controller 350, security processing unit 360, and/or the like) may perform one or more security checks on the packet using one or more SPUs, as described above with respect to FIGS. 1A-1E.

As further shown in FIG. 5, process 500 may include determining to offload subsequent packets associated with the traffic flow of the session using at least one of: a set of offloading indicators that are used to determine whether to offload the traffic flow of the session, or a data model that is used to generate recommendations indicating whether to offload the traffic flow of the session (block 530). For example, the network device (e.g., using packet processing component 322, controller 350, and/or the like) may determine to offload subsequent packets associated with the traffic flow of the session using at least one of: a set of offloading indicators that are used to determine whether to offload the traffic flow of the session, or a data model that is used to generate recommendations indicating whether to offload the traffic flow of the session, as described above with respect to FIGS. 1A-1E.

As further shown in FIG. 5, process 500 may include providing the packet to a device after performing the one or more security checks on the packet (block 540). For example, the network device (e.g., using packet processing component 322, external link 330, controller 350, and/or the like) may provide the packet to a device (e.g., the client device, another network device, etc.) after performing the one or more security checks on the packet, as described above with respect to FIGS. 1A-1E.

As further shown in FIG. 5, process 500 may include receiving another packet associated with the traffic flow of the session (block 550). For example, the network device (e.g., using packet processing component 322, external link 330, controller 350, and/or the like) may receive another packet associated with the traffic flow of the session, as described above with respect to FIGS. 1A-1E.

As further shown in FIG. 5, process 500 may include offloading the other packet based on determining that the other packet includes the session identification information of the session, wherein offloading the other packet allows the other packet to be routed through the network device without being subject to the one or more security checks (block 560). For example, the network device (e.g., using packet processing component 322, controller 350, and/or the like) may offload the other packet based on determining that the other packet includes the session identification information of the session, as described above with respect to FIGS. 1A-1E. In some implementations, offloading the other packet may allow the other packet to be routed through the network device without being subject to the one or more security checks.

As further shown in FIG. 5, process 500 may include providing the other packet to the device (block 570). For example, the network device (e.g., using packet processing component 322, external link 330, controller 350, and/or the like) may provide the other packet to the device, as described above with respect to FIGS. 1A-1E.

Process 500 may include additional implementations, such as any single implementation or any combination of implementations described below and/or in connection with one or more other processes described elsewhere herein.

In some implementations, the other packet may travel through an ingress port of the network device and an egress port of the network device without interacting with the one or more SPUs. In some implementations, the session may be part of a group of sessions, and a number of sessions in the group of sessions may be at least ten million sessions, at least fifty million sessions, at least one hundred million sessions, or at least five hundred million sessions.

In some implementations, when determining to offload the subsequent packets associated with the session, the network device may obtain the set of offloading indicators. The set of offloading indicators may include a first subset of offloading indicators that are indicators of whether the session is a high-throughput session or a second subset of offloading indicators that are indicators of whether one or more memory utilization rates associated with one or more line cards of the network device satisfy a threshold memory utilization rate. Additionally, the network device may process the set of offloading indicators to determine an overall indicator value that is to be used to determine whether to select the traffic flow of the session for offloading. Furthermore, the network device may determine to offload the subsequent packets based on determining that the overall indicator value satisfies a threshold overall indicator value. The threshold overall indicator value may be used as an indicator of when particular traffic flow is to be offloaded.

In some implementations, the network device may identify user preferences information associated with the session after performing the one or more security checks on the packet. The user preferences information may identify one or more devices associated with an entity that are to receive priority for offloading. Additionally, when determining to offload the subsequent packets associated with the session, the network device may determine to offload the subsequent packets based on the traffic flow being received from a particular device of the one or more devices that are to receive priority for offloading.

In some implementations, the network device may determine that the traffic flow of the session is no longer eligible for offloading after providing the other packet to the device. Additionally, the network device may receive an additional packet associated with the traffic flow of the session after determining that the traffic flow of the session is no longer eligible for offloading. Additionally, the network device may perform the one or more security checks on the additional packet. Additionally, the network device may provide the additional packet to the device.

In some implementations, the network device may monitor, after providing the other packet to the device, one or more memory utilization rates associated with one or more line cards of the network device. Additionally, the network device may determine that a memory utilization rate, of the one or more memory utilization rates, that is associated with a first line card, of the one or more line cards, satisfies a threshold memory utilization rate. The traffic flow of the session may be associated with the first line card. Additionally, the network device may route a portion of the traffic flow of the session to other line cards based on determining that the memory utilization rate satisfies the threshold memory utilization rate.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
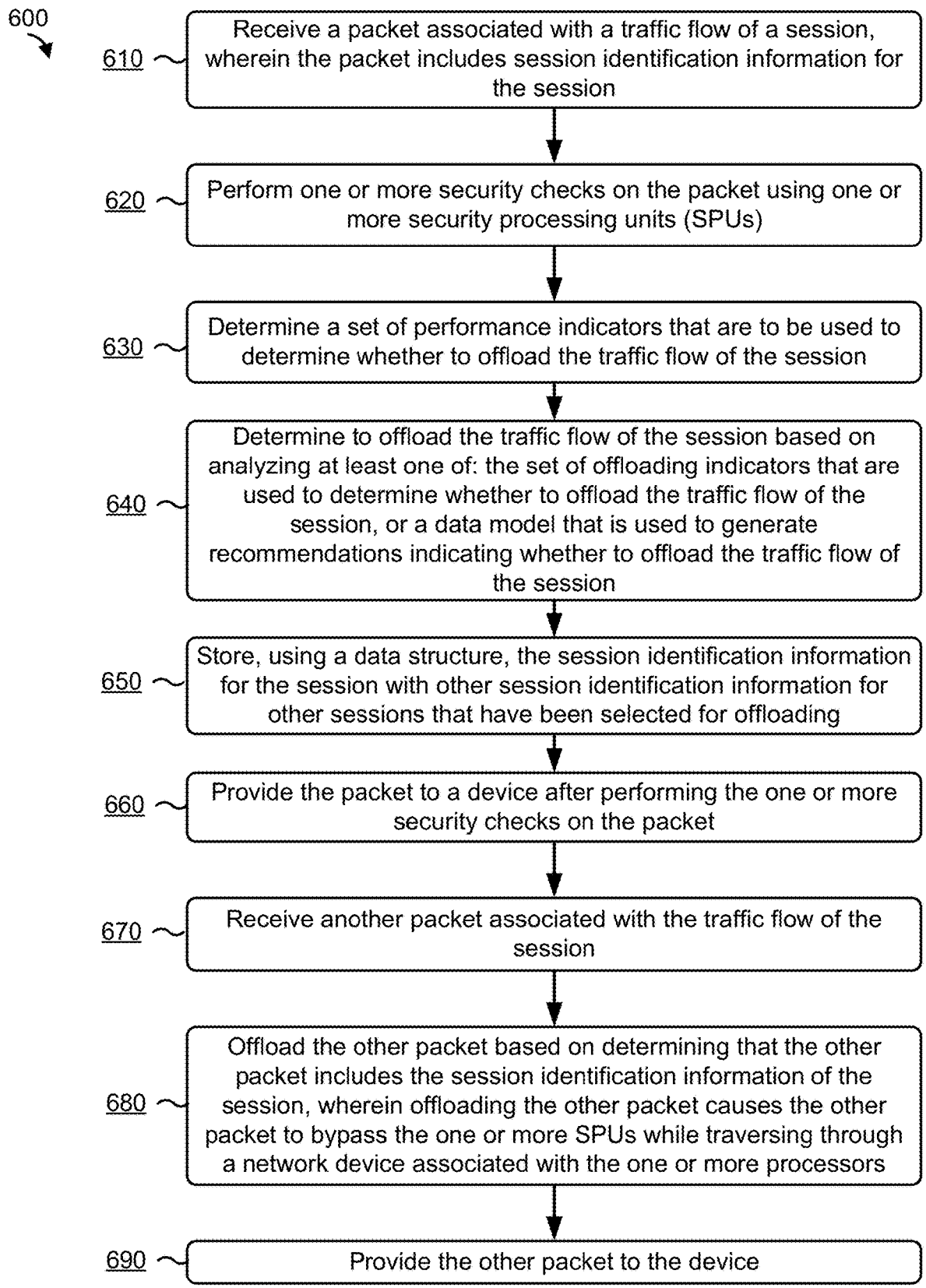

FIG. 6 is a flow chart of an example process 600 for offloading traffic flow of particular sessions by using a set of offloading indicators and/or machine learning techniques to identify the particular sessions as optimal sessions for offloading. In some implementations, one or more process blocks of FIG. 6 may be performed by a network device (e.g., network device 220). In some implementations, one or more process blocks of FIG. 6 may be performed by another device or a group of devices separate from or including the network device, such as a client device (e.g., client device 210).

As shown in FIG. 6, process 600 may include receiving a packet associated with a traffic flow of a session, wherein the packet includes session identification information for the session (block 610). For example, the network device (e.g., using packet processing component 322, external link 330, controller 350, and/or the like) may receive a packet associated with a traffic flow of a session, as described above with respect to FIGS. 1A-1E. In some implementations, the packet may include session identification information for the session.

As further shown in FIG. 6, process 600 may include performing one or more security checks on the packet using one or more security processing units (SPUs) (block 620). For example, the network device (e.g., using controller 350, security processing unit 360, and/or the like) may perform one or more security checks on the packet using one or more SPUs, as described above with respect to FIGS. 1A-1E.

As further shown in FIG. 6, process 600 may include determining, after receiving the packet, a set of offloading indicators that are to be used to determine whether to offload the traffic flow of the session (block 630). For example, the network device (e.g., using packet processing component 322, controller 350, and/or the like) may determine, after receiving the packet, a set of offloading indicators that are to be used to determine whether to offload the traffic flow of the session, as described above with respect to FIGS. 1A-1E.

As further shown in FIG. 6, process 600 may include determining to offload the traffic flow of the session based on analyzing at least one of: the set of offloading indicators that are used to determine whether to offload the traffic flow of the session, or a data model that is used to generate recommendations indicating whether to offload the traffic flow of the session (block 640). For example, the network device (e.g., using packet processing component 322, controller 350, and/or the like) may determine to offload the traffic flow of the session based on analyzing at least one of: the set of offloading indicators that are used to determine whether to offload the traffic flow of the session, or a data model that is used to generate recommendations indicating whether to offload the traffic flow of the session, as described above with respect to FIGS. 1A-1E.

As further shown in FIG. 6, process 600 may include storing, using a data structure, the session identification information for the session with other session identification information for other sessions that have been selected for offloading (block 650). For example, the network device (e.g., using packet processing component 322, controller 350, and/or the like) may store, using a data structure, the session identification information for the session with other session identification information for other sessions that have been selected for offloading, as described above with respect to FIGS. 1A-1E.

As further shown in FIG. 6, process 600 may include providing the packet to a device after performing the one or more security checks on the packet (block 660). For example, the network device (e.g., using packet processing component 322, external link 330, controller 350, and/or the like) may provide the packet to a device (e.g., the client device, another network device, etc.) after performing the one or more security checks on the packet, as described above with respect to FIGS. 1A-1E.

As further shown in FIG. 6, process 600 may include receiving another packet associated with the traffic flow of the session (block 670). For example, the network device (e.g., using packet processing component 322, external link 330, controller 350, and/or the like) may receive another packet associated with the traffic flow of the session, as described above with respect to FIGS. 1A-1E.

As further shown in FIG. 6, process 600 may include offloading the other packet based on determining that the other packet includes the session identification information of the session, wherein offloading the other packet causes the other packet to bypass the one or more SPUs while traversing through a network device associated with the one or more processors (block 680). For example, the network device (e.g., using packet processing component 322, controller 350, and/or the like) may offload the other packet based on determining that the other packet includes the session identification information of the session, as described above with respect to FIGS. 1A-1E. In some implementations, offloading the other packet may cause the other packet to bypass the one or more SPUs while traversing through the network device.

As further shown in FIG. 6, process 600 may include providing the other packet to the device (block 690). For example, the network device (e.g., using packet processing component 322, external link 330, controller 350, and/or the like) may provide the other packet to the device, as described above with respect to FIGS. 1A-1E.

Process 600 may include additional implementations, such as any single implementation or any combination of implementations described below and/or in connection with one or more other processes described elsewhere herein.

In some implementations, the session may be part of a group of sessions, and a number of sessions in the group of sessions may be at least ten million sessions, at least fifty million sessions, at least one hundred million sessions, or at least five hundred million sessions.

In some implementations, before determining to offload the traffic flow of the session, the network device may determine that a memory utilization rate associated with a first line card satisfies a threshold memory utilization rate. The traffic flow of the session may traverse through the first line card. Additionally, the network device may modify a threshold overall indicator value that is to be used to determine whether to select the traffic flow that traverses through the first line card for offloading based on determining that the memory utilization rate associated with the first line card satisfies the threshold memory utilization rate. In some implementations, when determining to offload the traffic flow of the session, the network device may process the set of offloading indicators to determine an overall indicator value that is to be used to determine whether to select the traffic flow of the session for offloading. Additionally, the network device may determine to offload the traffic flow based on determining that the overall indicator value satisfies the threshold overall indicator value that has been modified.

In some implementations, the network device may obtain an updated set of offloading indicators after providing the other packet to the device. Additionally, the network device may process the updated set of offloading indicators to determine an overall indicator value. Additionally, the network device may determine that the overall indicator value does not satisfy a threshold overall indicator value. Additionally, the network device may determine that the traffic flow of the session is no longer eligible for offloading based on determining that the overall indicator value does not satisfy the threshold overall indicator value. In this case, determining that the traffic flow of the session is no longer eligible for offloading may cause the one or more SPUs to perform the one or more security checks on additional packets that are received as part of the traffic flow of the session.

In some implementations, the network device may monitor, after providing the other packet to the device, one or more memory utilization rates associated with one or more line cards. Additionally, the network device may determine that a particular memory utilization rate that is associated with a first line card, of the one or more line cards, satisfies a threshold memory utilization rate. Additionally, the network device may perform an action associated with load balancing the traffic flow or improving accuracy of a technique used to determine whether to offload the traffic flow based on determining that the particular memory utilization rate satisfies the threshold memory utilization rate. The action may include a first action to modify a threshold overall indicator value used to analyze the set of offloading indicators, a second action to retrain the data model that is used to generate the recommendations indicating whether to offload the traffic flow of the session, or a third action to route packets to load balance the traffic flow.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

By intelligently offloading packets associated with the traffic flow of particular sessions, the network device efficiently and effectively utilizes resources (e.g., processing resources, network resources, memory resources, etc.). For example, intelligently identifying particular sessions for offloading allows the network device to effectively utilize resources by offloading packets that may not need to be processed by the SPU, thereby freeing up resources that may be used to process other packets that do need to be processed by the SPU.

Additionally, the network device may consider real-time memory utilization rates of one or more line cards, and may intelligently modify rules or machine learning models used to select sessions for offloading based on the real-time memory utilization rates. By using real-time data to select sessions for offloading, the network device ensures an efficient and effective utilization of resources. Furthermore, if the network device is presently offloading packets for a session, the network device may determine that the packets are no longer eligible for offloading, thereby conserving resources that might otherwise be used to continue to offload packets for the session The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

As used herein, the term traffic flow may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A network device, comprising:
one or more security processing units (SPUs);
one or more memories; and
one or more processors to:
receive a packet associated with a traffic flow of a session,
wherein the packet includes session identification information for the session;
determine, after receiving the packet, to offload subsequent packets associated with the traffic flow of the session using:
a set of offloading indicators that are used to determine whether to offload the traffic flow of the session,
wherein the set of offloading indicators include at least one of:
a first indicator that indicates a quantity of packets that have been transmitted during the session,
a second indicator that indicates a type of session that is likely to have a threshold amount of throughput, or
a third indicator that indicates whether a memory utilization rate associated with an integrated circuit of the network device satisfies a threshold memory utilization rate, and
a data model that is used to generate recommendations indicating whether to offload the traffic flow of the session,
wherein the data model is trained with information associated with one or more of:
historical offloading indicators,
historical information indicating whether traffic flow of particular sessions was offloaded, or
historical information indicating whether the traffic flow of the particular sessions should have been offloaded, and
wherein the data model is used to determine whether a threshold associated with being a high-throughput session is satisfied;
store, using a data structure, the session identification information for the session with other session identification information for other sessions that have been selected for offloading;
provide the packet to a device after storing the session identification information;
receive another packet associated with the traffic flow of the session;
determine to offload the other packet by determining that the other packet includes the session identification information for the traffic flow of the session that is to be offloaded;
offload the other packet to permit the other packet to traverse through the network device without the one or more SPUs performing one or more security checks on the other packet; and
provide the other packet to the device.

2. The network device of claim 1, wherein the session is part of a group of sessions, and wherein a number of sessions in the group of sessions is:
at least ten million sessions,
at least fifty million sessions,
at least one hundred million sessions, or
at least five hundred million sessions.

3. The network device of claim 1, wherein the one or more processors, when determining to offload the subsequent packets associated with the session, are to:
obtain or determine the set of offloading indicators,
wherein the set of offloading indicators further includes:
a fourth indicator that indicates a duration of the session,
process the set of offloading indicators to determine an overall indicator value that is to be used to determine whether to select the traffic flow of the session for offloading, and
determine to offload the subsequent packets based on the overall indicator value satisfying a threshold overall indicator value,
wherein the threshold overall indicator value is used as an indicator of when particular traffic flow is to be offloaded.

4. The network device of claim 1, further comprising one or more integrated circuits; and wherein the one or more processors are further to:
determine, before determining to offload the traffic flow of the session, that the memory utilization rate satisfies the threshold memory utilization rate,
wherein the traffic flow of the session traverses through the first integrated circuit;
dynamically modify, based on determining that the memory utilization rate satisfies the threshold memory utilization rate, a threshold overall indicator value that is to be used to determine whether to offload the subsequent packets associated with the traffic flow of the session; and
wherein the one or more processors, when determining to offload the subsequent packets associated with the traffic flow of the session, are to:
use the threshold overall indicator value when processing the set of offloading indicators to determine to offload the subsequent packets associated with the traffic flow of the session.

5. The network device of claim 1, wherein the one or more processors are further to:
identify user preferences information associated with the session after performing one or more security checks on the packet,
wherein the user preferences information identifies one or more devices associated with an entity that are to receive priority for offloading; and
wherein the one or more processors, when determining to offload the subsequent packets associated with the session, are to:
determine to offload the subsequent packets based on the traffic flow being received from a particular device of the one or more devices that is to receive priority for offloading.

6. The network device of claim 1, wherein the one or more processors, when determining to offload the subsequent packets associated with the session, are to:
provide the set of offloading indicators as input to the data model to cause the data model to output one or more values associated with a recommendation to select the traffic flow of the session for offloading, and
determine to offload the subsequent packets based on the one or more values associated with the recommendation to select the traffic flow of the session for offloading.

7. The network device of claim 1, further comprising one or more integrated circuits; and wherein the one or more processors are further to:
monitor, after providing the other packet to the device, one or more memory utilization rates associated with the one or more integrated circuits;
determine, based on monitoring the one or more memory utilization rates associated with the one or more integrated circuits, that the memory utilization rate, satisfies the threshold memory utilization rate,
wherein the traffic flow of the session is associated with the integrated circuit; and
route a portion of the traffic flow of the session to other integrated circuits based on determining that the memory utilization rate satisfies the threshold memory utilization rate.

8. A method, comprising:
receiving, by a network device, a packet associated with a traffic flow of a session,
wherein the packet includes session identification information for the session;
performing, by the network device, one or more security checks on the packet using one or more security processing units (SPUs);
determining, by the network device, to offload subsequent packets associated with the traffic flow of the session using:
a set of offloading indicators that are used to determine whether to offload the traffic flow of the session,
wherein the set of offloading indicators include at least one of:
a first indicator that indicates a quantity of packets that have been transmitted during the session,
a second indicator that indicates a type of session that is likely to have a threshold amount of throughput, or
a third indicator that indicates whether a memory utilization rate associated with an integrated circuit of the network device satisfies a threshold memory utilization rate, and
a data model that is used to generate recommendations indicating whether to offload the traffic flow of the session,
wherein the data model is trained with information associated with one or more of:
historical offloading indicators,
historical information indicating whether traffic flow of particular sessions was offloaded, or
historical information indicating whether the traffic flow of the particular sessions should have been offloaded, and
wherein the data model is used to determine whether a threshold associated with being a high-throughput session is satisfied;
providing, by the network device, the packet to a device after performing the one or more security checks on the packet;
receiving, by the network device, another packet associated with the traffic flow of the session;
offloading, by the network device, the other packet based on determining that the other packet includes the session identification information of the session,
wherein offloading the other packet allows the other packet to be routed through the network device without being subject to the one or more security checks; and
providing, by the network device, the other packet to the device.

9. The method of claim 8, wherein the other packet travels through an ingress port of the network device and an egress port of the network device without interacting with the one or more SPUs.

10. The method of claim 8, wherein the session is part of a group of sessions, and wherein a number of sessions in the group of sessions is:
at least ten million sessions,
at least fifty million sessions,
at least one hundred million sessions, or
at least five hundred million sessions.

11. The method of claim 8, wherein determining to offload the subsequent packets associated with the session comprises:
obtaining the set of offloading indicators,
processing the set of offloading indicators to determine an overall indicator value that is to be used to determine whether to select the traffic flow of the session for offloading, and
determining to offload the subsequent packets based on determining that the overall indicator value satisfies a threshold overall indicator value,
wherein the threshold overall indicator value is used as an indicator of when particular traffic flow is to be offloaded.

12. The method of claim 8, further comprising:
identifying user preferences information associated with the session after performing the one or more security checks on the packet,
wherein the user preferences information identifies one or more devices associated with an entity that are to receive priority for offloading; and
wherein determining to offload the subsequent packets associated with the session comprises:
determining to offload the subsequent packets based on the traffic flow being received from a particular device of the one or more devices that are to receive priority for offloading.

13. The method of claim 8, further comprising:
determining that the traffic flow of the session is no longer eligible for offloading after providing the other packet to the device;
receiving an additional packet associated with the traffic flow of the session after determining that the traffic flow of the session is no longer eligible for offloading;
performing the one or more security checks on the additional packet; and
providing the additional packet to the device.

14. The method of claim 8, further comprising:
monitoring, after providing the other packet to the device, one or more memory utilization rates associated with one or more integrated circuits of the network device;
determining, based on monitoring the one or more memory utilization rates associated with the one or more integrated circuits, that the memory utilization rate satisfies the threshold memory utilization rate,
wherein the traffic flow of the session is associated with the first integrated circuit; and
route a portion of the traffic flow of the session to other integrated circuits based on determining that the memory utilization rate satisfies the threshold memory utilization rate.

15. A non-transitory computer-readable medium storing instructions, the instructions comprising:

one or more instructions that, when executed by one or more processors, cause the one or more processors to:
  receive a packet associated with a traffic flow of a session,
    wherein the packet includes session identification information for the session;
  perform one or more security checks on the packet using one or more security processing units (SPUs);
  determine, after receiving the packet, a set of offloading indicators that are to be used to determine whether to offload the traffic flow of the session,
    wherein the set of offloading indicators include at least one of:
      a first indicator that indicates a quantity of packets that have been transmitted during the session,
      a second indicator that indicates a type of session that is likely to have a threshold amount of throughput, or
      a third indicator that indicates whether a memory utilization rate associated with an integrated circuit of a network device satisfies a threshold memory utilization rate;
  determine to offload the traffic flow of the session based on analyzing:
    the set of offloading indicators that are used to determine whether to offload the traffic flow of the session, and
    a data model that is used to generate recommendations indicating whether to offload the traffic flow of the session,
      wherein the data model is trained with information associated with one or more of:
        historical offloading indicators,
        historical information indicating whether traffic flow of particular sessions was offloaded, or
        historical information indicating whether the traffic flow of the particular sessions should have been offloaded, and
      wherein the data model is used to determine whether a threshold associated with being a high-throughput session is satisfied;
  store, using a data structure, the session identification information for the session with other session identification information for other sessions that have been selected for offloading;
  provide the packet to a device after performing the one or more security checks on the packet;
  receive another packet associated with the traffic flow of the session;
  offload the other packet based on determining that the other packet includes the session identification information of the session,
    wherein offloading the other packet causes the other packet to bypass the one or more SPUs while traversing through the network device; and
  provide the other packet to the device.

16. The non-transitory computer-readable medium of claim 15,
  wherein the session is part of a group of sessions, and
  wherein a number of sessions in the group of sessions is:
    at least ten million sessions,
    at least fifty million sessions,
    at least one hundred million sessions, or
    at least five hundred million sessions.

17. The non-transitory computer-readable medium of claim 15, wherein the one or more instructions, when executed by the one or more processors, further cause the one or more processors to:
  determine, before determining to offload the traffic flow of the session, that the memory utilization rate satisfies the threshold memory utilization rate,
    wherein the traffic flow of the session traverses through the first integrated circuit;
  modify a threshold overall indicator value that is to be used to determine whether to select the traffic flow that traverses through the integrated circuit for offloading based on determining that the memory utilization rate associated with the integrated circuit satisfies the threshold memory utilization rate; and
  wherein the one or more instructions, that cause the one or more processors to determine to offload the traffic flow of the session, cause the one or more processors to:
    process the set of offloading indicators to determine an overall indicator value that is to be used to determine whether to select the traffic flow of the session for offloading, and
    determine to offload the traffic flow based on determining that the overall indicator value satisfies the threshold overall indicator value that has been modified.

18. The non-transitory computer-readable medium of claim 15, wherein the one or more instructions, when executed by the one or more processors, further cause the one or more processors to:
  obtain an updated set of offloading indicators after providing the other packet to the device;
  process the updated set of offloading indicators to determine an overall indicator value;
  determine that the overall indicator value does not satisfy a threshold overall indicator value; and
  determine that the traffic flow of the session is no longer eligible for offloading based on determining that the overall indicator value does not satisfy the threshold overall indicator value,
    wherein determining that the traffic flow of the session is no longer eligible for offloading causes the one or more SPUs are to perform the one or more security checks on additional packets that are received as part of the traffic flow of the session.

19. The non-transitory computer-readable medium of claim 15, wherein the one or more instructions, when executed by the one or more processors, further cause the one or more processors to:
  monitor, after providing the other packet to the device, one or more memory utilization rates associated with one or more integrated circuits;
  determine, based on monitoring the one or more memory utilization rates associated with the one or more integrated circuits, that the memory utilization rate satisfies the threshold memory utilization rate; and
  perform an action associated with load balancing the traffic flow or improving accuracy of a technique used to determine whether to offload the traffic flow based on determining that the memory utilization rate satisfies the threshold memory utilization rate.

20. The non-transitory computer-readable medium of claim 19, wherein the action includes:
  a first action to modify a threshold overall indicator value used to analyze the set of offloading indicators, a second action to retrain the data model that is used to generate the recommendations indicating whether to offload the traffic flow of the session, or a third action to route packets to load balance the traffic flow.

\* \* \* \* \*

UNITED STATES PATENT AND TRADEMARK OFFICE
CERTIFICATE OF CORRECTION

| | |
|---|---|
| PATENT NO. | : 10,862,805 B1 |
| APPLICATION NO. | : 16/051119 |
| DATED | : December 8, 2020 |
| INVENTOR(S) | : Craig Dods et al. |

Page 1 of 1

It is certified that error appears in the above-identified patent and that said Letters Patent is hereby corrected as shown below:

In the Claims

Claim 4:
Column 24, Line 27, change "the first integrated circuit;" to --the integrated circuit;--

Claim 14:
Column 26, Line 61, change "the first integrated circuit; and" to --the integrated circuit; and--

Claim 17:
Column 28, Line 9, change "the first integrated circuit;" to --the integrated circuit;--

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*